(12) United States Patent
Watson

(10) Patent No.: US 11,208,045 B2
(45) Date of Patent: Dec. 28, 2021

(54) POWER RETRACTABLE BUMPER STEP

(71) Applicant: Magna Exteriors Inc., Concord (CA)

(72) Inventor: Bradley E. Watson, Barrie (CA)

(73) Assignee: MAGNA EXTERIORS, INC., Concord (CA)

( * ) Notice: Subject to any disclaimer, the term of this patent is extended or adjusted under 35 U.S.C. 154(b) by 227 days.

(21) Appl. No.: 16/685,131

(22) Filed: Nov. 15, 2019

(65) Prior Publication Data
US 2020/0156547 A1   May 21, 2020

Related U.S. Application Data

(60) Provisional application No. 62/769,240, filed on Nov. 19, 2018.

(51) Int. Cl.
*B60R 3/02* (2006.01)

(52) U.S. Cl.
CPC ..................... *B60R 3/02* (2013.01)

(58) Field of Classification Search
CPC ........... B60R 3/00; B60R 3/002; B60R 3/005; B60R 3/02
See application file for complete search history.

(56) References Cited

U.S. PATENT DOCUMENTS

| | | | |
|---|---|---|---|
| 3,758,134 A | 9/1973 | Stewart | |
| 6,834,875 B2 * | 12/2004 | Leitner | B60R 3/002 280/166 |
| 10,099,621 B1 * | 10/2018 | Jensen | B60R 19/42 |
| 2017/0174138 A1 | 6/2017 | Fortin et al. | |
| 2018/0065560 A1 | 3/2018 | Krishnan et al. | |
| 2018/0086273 A1 | 3/2018 | Leitner et al. | |
| 2020/0156547 A1 * | 5/2020 | Watson | B60R 3/02 |

FOREIGN PATENT DOCUMENTS

| | | |
|---|---|---|
| JP | H0576884 U | 10/1993 |
| JP | 2002046538 A | 2/2002 |
| JP | 2008239010 A | 10/2008 |
| WO | 2018103627 A1 | 6/2018 |

OTHER PUBLICATIONS

Extended European Search Report fro Application No. 19209905.9, dated Mar. 6, 2020.

* cited by examiner

*Primary Examiner* — Bryan A Evans
(74) *Attorney, Agent, or Firm* — Warn Partners, P.C.

(57) ABSTRACT

A power box step on a vehicle having a safety arrangement that provides noticeable controlled failure of the power box step if damaged. The controlled failure is accomplished by using vertical and horizontal shear pins that are designed to break when the horizontal or vertical load applied to the step is too great. The failure of the step is controlled by vertical and horizontal movement limit pins that prevent the step from moving too far in the vertical or horizontal direction when failure occurs.

23 Claims, 15 Drawing Sheets

POWER RETRACTABLE BUMPER STEP

FIELD OF THE INVENTION

The present invention relates to a power box step on a vehicle having a safety arrangement that provides noticeable controlled failure of the power step if damaged.

BACKGROUND OF THE INVENTION

There are several aftermarket companies marketing both manually operated and powered versions of side and rear mounted steps for pickup trucks. They address the requirement for ingress and egress of the truck bed or reach access to the bed area to place or retrieve items stored in the truck bed. These products, when grossly overloaded by stepping (hereafter referred to as a vertical damage load) on them can experience a catastrophic failure as components fracture or yield to the loading; resulting in a safety issue and costly repair. There is yet another possible scenario whereby the step remains deployed while the vehicle is moving forward or rearward, thereby damaging the step in what will be referred to herein as a horizontal damage load. This impact needs to be absorbed without a major failure to the step. Thus there is a need to provide for a controlled failure by means of a multi-axis design and also visually demonstrates a damaged unit to the customer so that the customer is not likely to step on it again until repaired.

It is also desirable to provide a safety arrangement that if the damage is caused by a vertical damage load on the step, the person's foot or feet will not slide off of the step surface due to a significant downward angle of the step pad surface after failure. In the event of the failure occurring due to a horizontal damage load, the step must not be dragging on the ground and allow safe travel of the vehicle while damaged. It is further desirable to provide a safety arrangement where in the event of a partial retraction of the linkage by means of the ball detent device, the step has the ability to self repair or restore operation without any component replacement.

SUMMARY OF THE INVENTION

The invention uses a shear pin concept such that the step can rotate down partially to a limit of travel as controlled by another shear pin or limit stop bolt. The design also provides for a partial retraction of the step linkage as controlled by a spring loaded detent device that protects the drive motor from damage and can self correct this retraction back to an operational condition when the step is powered through another stow/deploy cycle. The invention provides for a combination of partial linkage retraction at the same time as a shearing of the pin that holds the step in design position. By limiting the downward rotation of this step by another shear pin in a limiting slot controls the failure in a two stage fashion. This concept could be applied to both vertical and horizontal pivot axis. To address the requirement for a side impact, there exists another vertical rotational axis with a shear pin and travel limit bolt with limiting slot. In a failure of any of the shear pins, the step is both noticeably damaged and the vehicle can still be driven to a service facility without any components dragging on the ground. It is important that the step assembly is noticeably out of position so that the user does not attempt to use it at a further safety risk. In addition to be easily serviceable, the cost is minimal for parts and labor to replace a broken pin.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

An articulating step assembly for a vehicle which includes a mount for attachment to a vehicle, a step member and an articulating linkage connecting the mount and the step for stowing and deploying the step. A motor is attached to the linkage to provide raising and lowering of the step. Another embodiment includes a weather sealed non-contact switch located on the assembly for actuating the motor and linkage in response to movement of the step in a predetermined direction for deploying the step.

Figure 1:
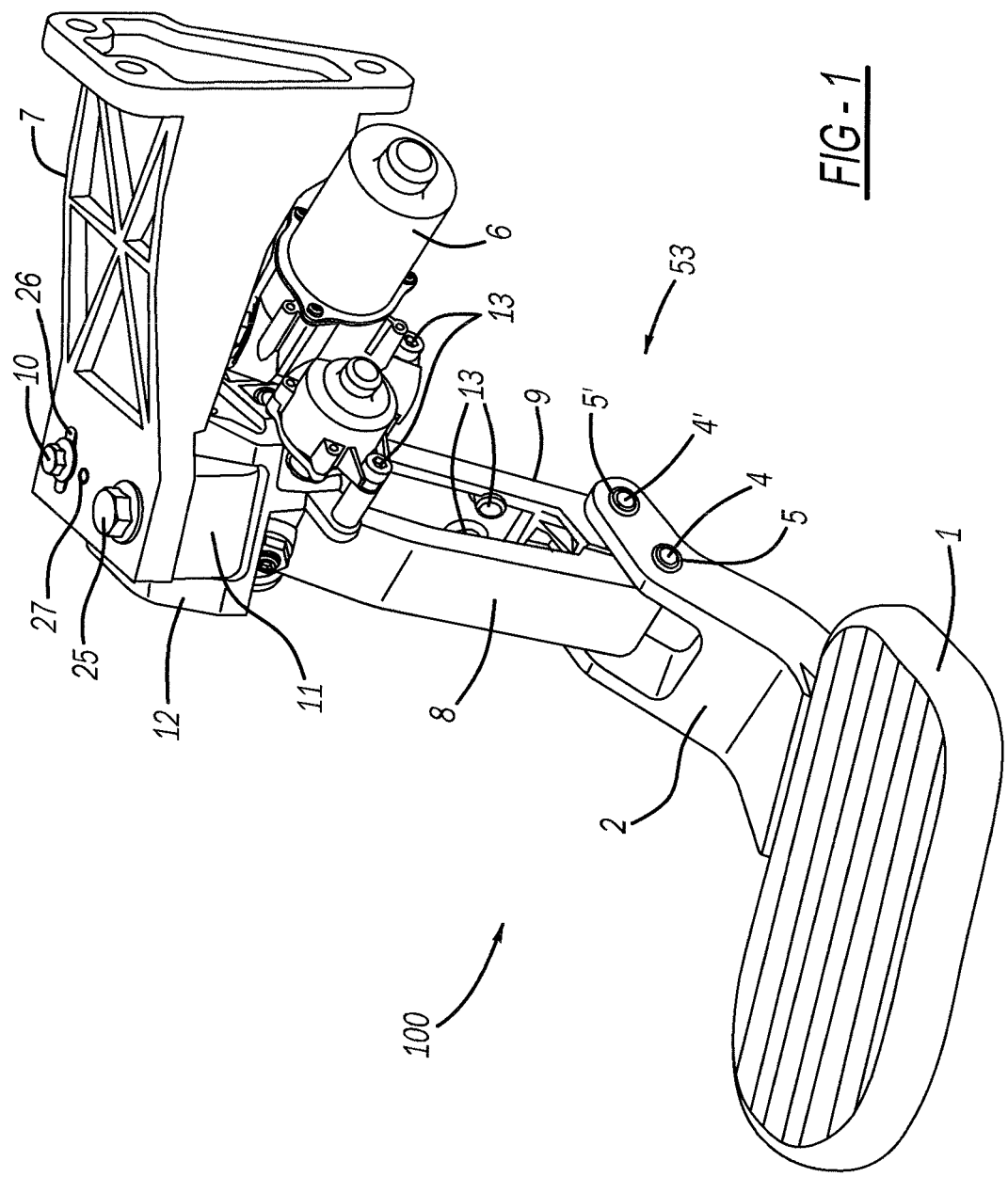
FIG. 1 is an front perspective view of the articulating step of the present invention shown in a deployed position.
Figure 2:
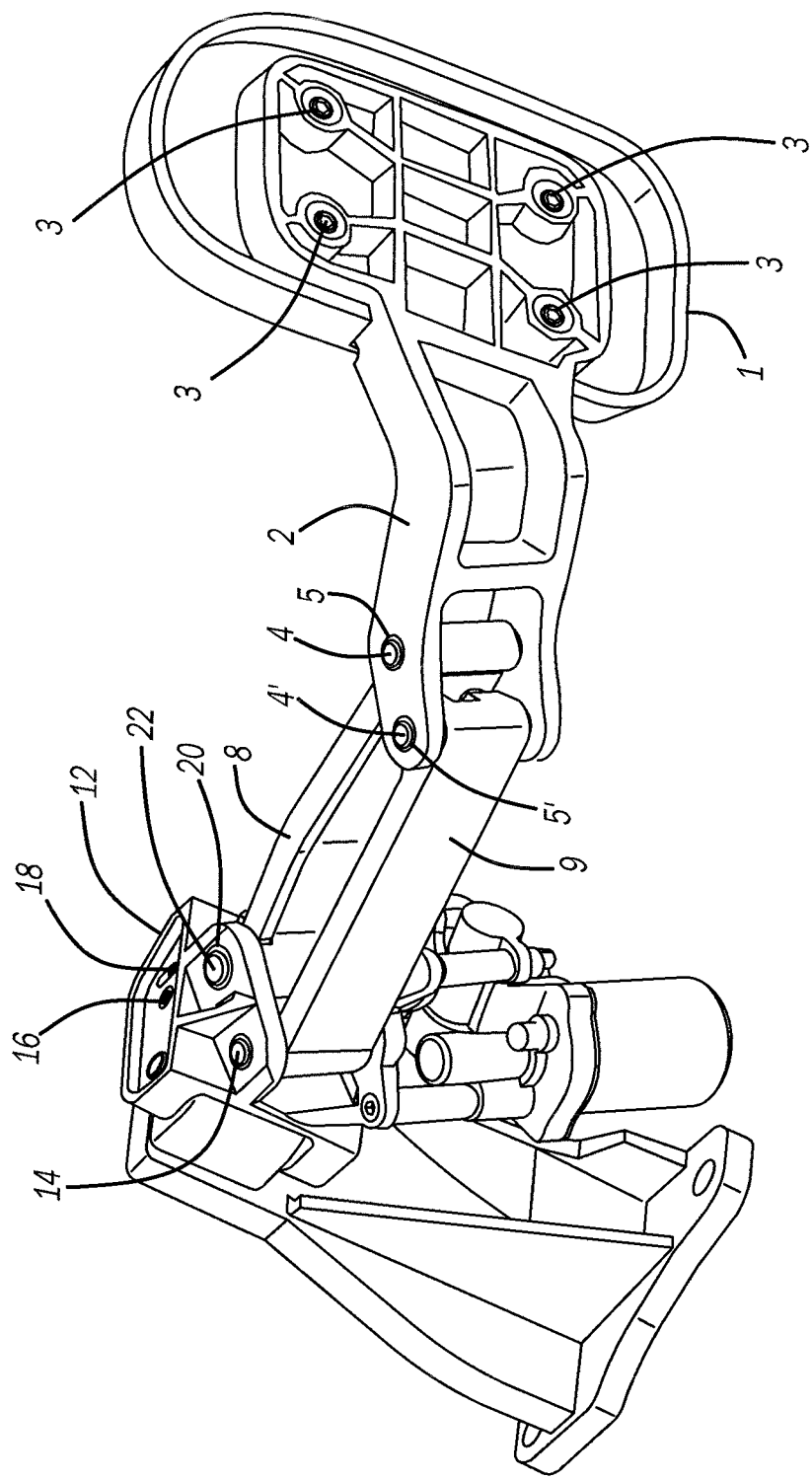
FIG. 2 is a back perspective view of the articulating step of FIG. 1.
Figure 3:
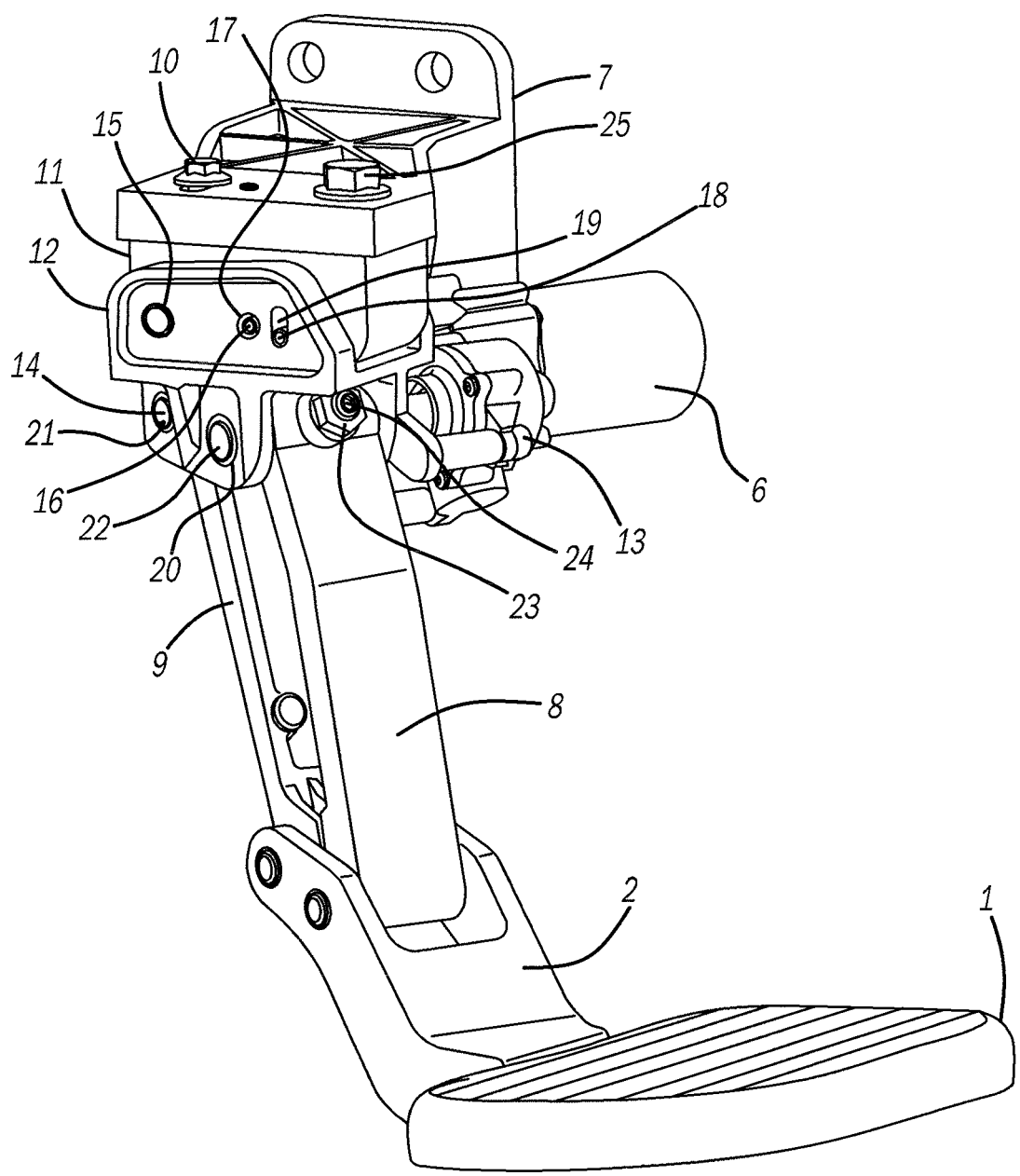
FIG. 3 is a front perspective view of the articulating step of FIG. 1.
Figure 4:
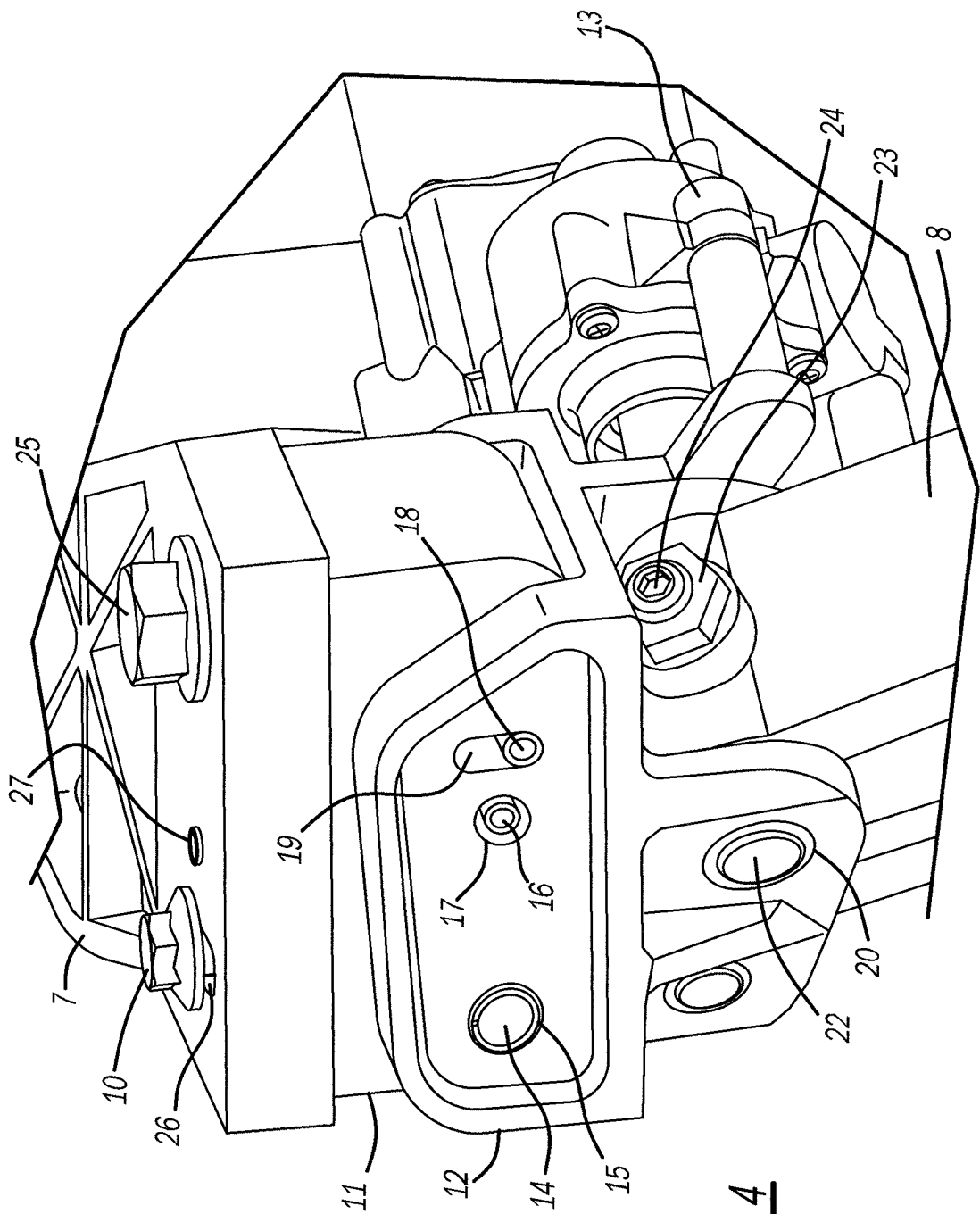
FIG. 4 is a top perspective view of the upper link and pivot block of the articulating step of the present invention.

Referring now to FIG. 1 there is shown an articulating step assembly for a vehicle is generally shown at 100. Articulating step assembly 100 includes a mount 7 for attachment to a frame 37 of vehicle 34 using bolts 41 (Shown in FIG. 10), a step member 1 and an articulating linkage, generally indicated at 53. The articulating linkage 53 is operably connected between the mount 7 and the step member 1 for stowing and deploying the step member 1. A motor 6 is attached to the articulating linkage 53 to provide raising and lowering of the step member 1. The motor 6 is connected to the upper link 12 using bolts 13.

In an alternative embodiment of the invention shown in FIGS. 12-15, there is a weather sealed non-contact magnetic switch generally indicated at 50, that is located on an assembly 200 for actuating the motor 6 and articulating linkage 53 in response to movement of the step 1 in a predetermined direction, such as upward or downward in arrow direction 54 for deploying the step 1.

Step 1 is connected to a base member 46 which is connected to a lower link 2 of the articulating linkage 53 using fasteners 3. In the embodiment shown in FIGS. 12-15 the base member 46 is pivotally attached to a lower link 2 at pivot point, which is a pin 44 and aperture 45. The step 1 is biased into its downward position by way of a spring 52 operating on a flange 60. In a preferred embodiment the base member 46 is tilt able in an upward direction for about 5 degrees of motion.

Figure 7:
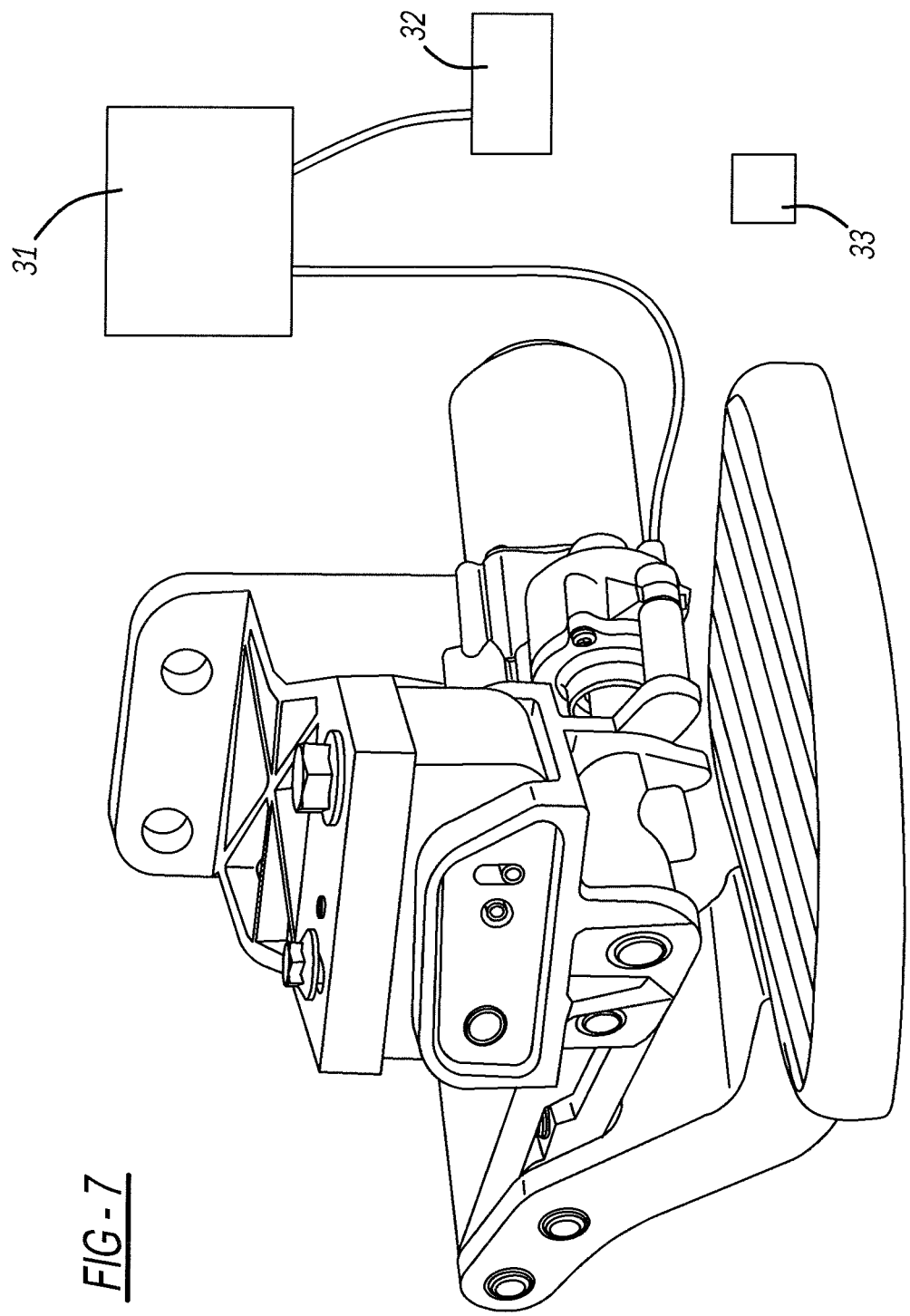
FIG. 7 is a front perspective view side view of the articulating step shown in the retracted position.
Figure 8:
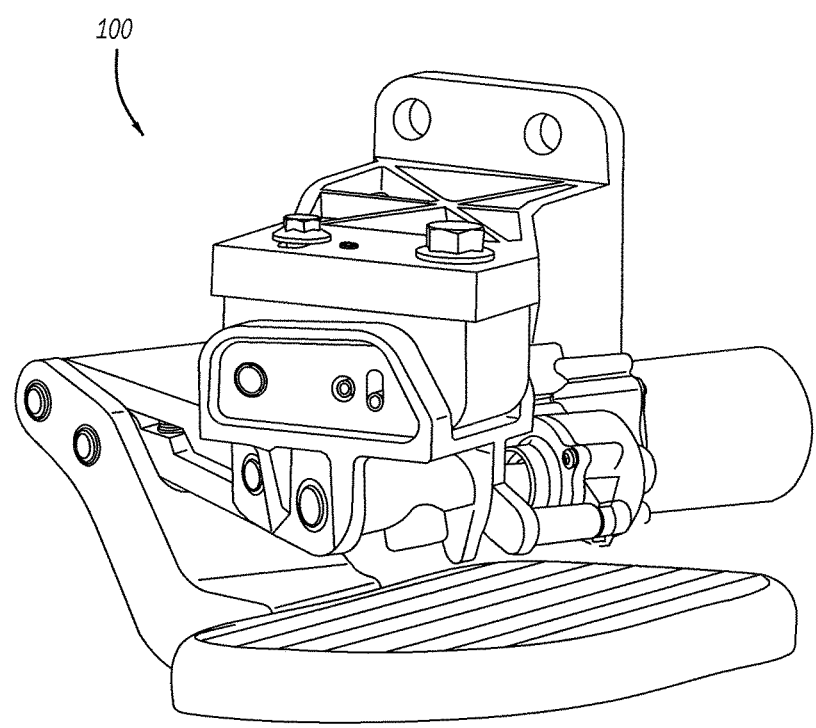
FIG. 8 is another front perspective view side view of the articulating step shown in the retracted position.
Figure 10:
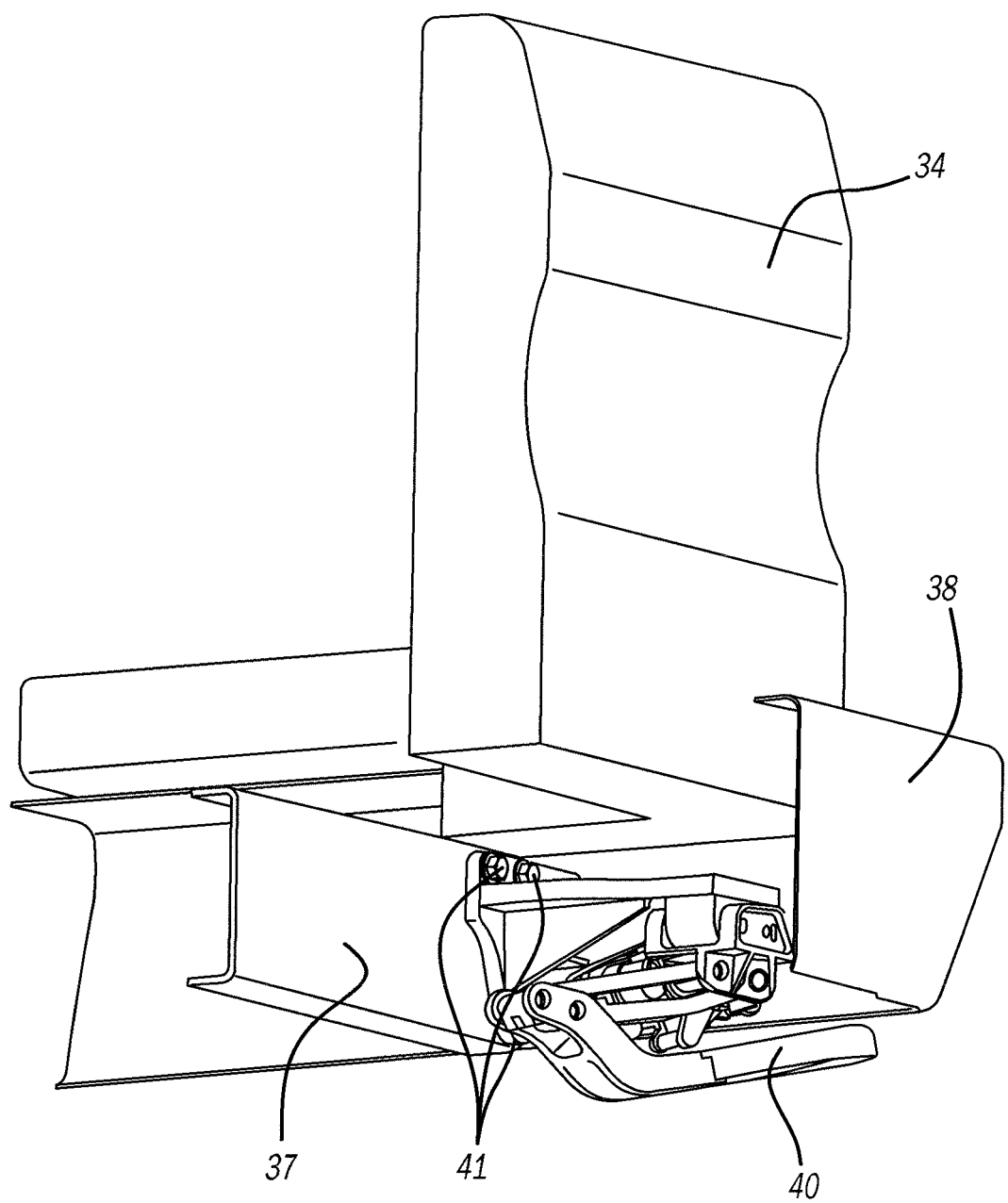
FIG. 10 is a cross-sectional schematic view of the articulating step in the retracted position, connected to a pickup truck bed.
Figure 11:
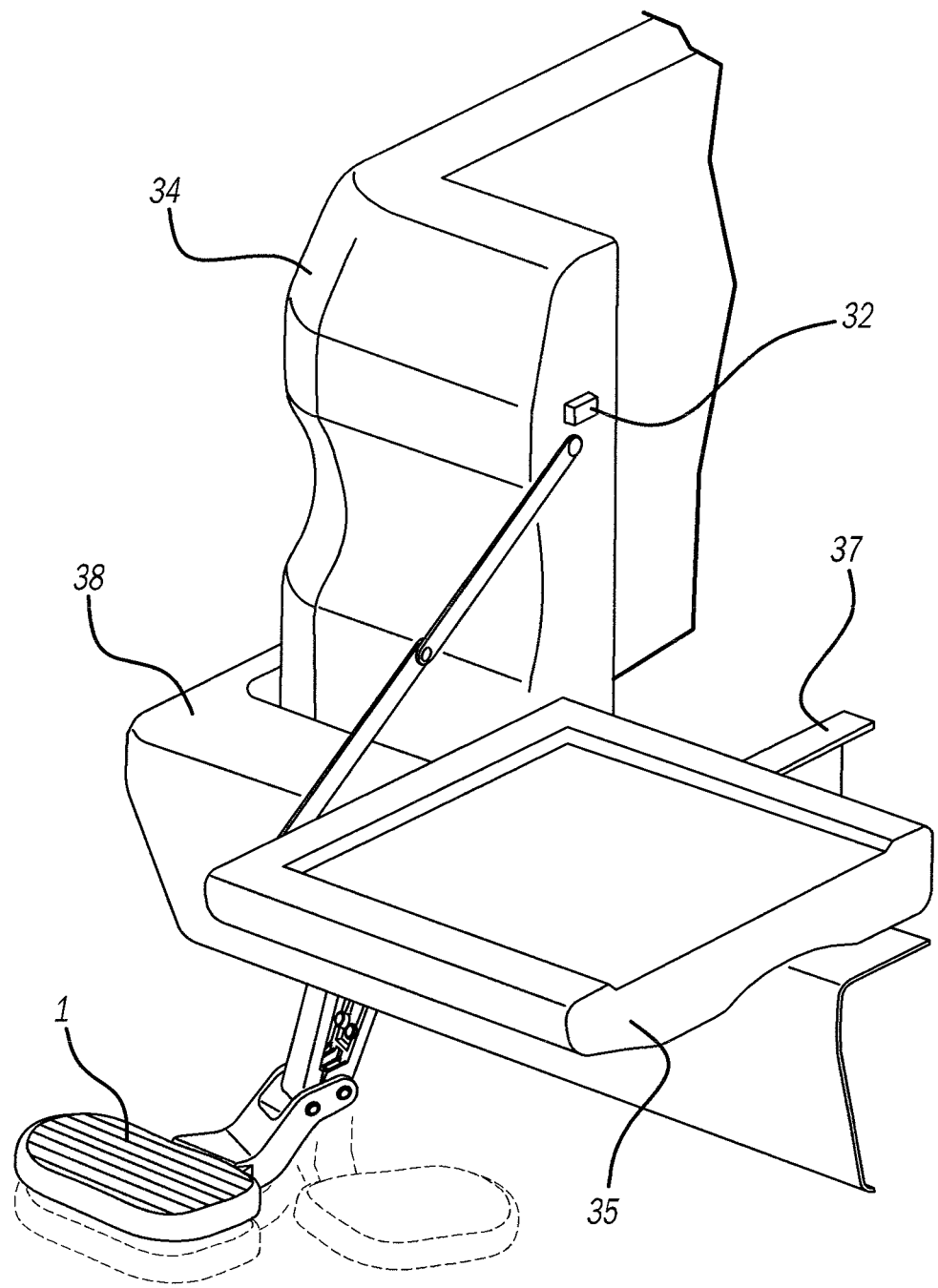
FIG. 11 is an schematic front perspective view of the articulating step in the extended position, connected to a pickup truck bed.
Figure 12:
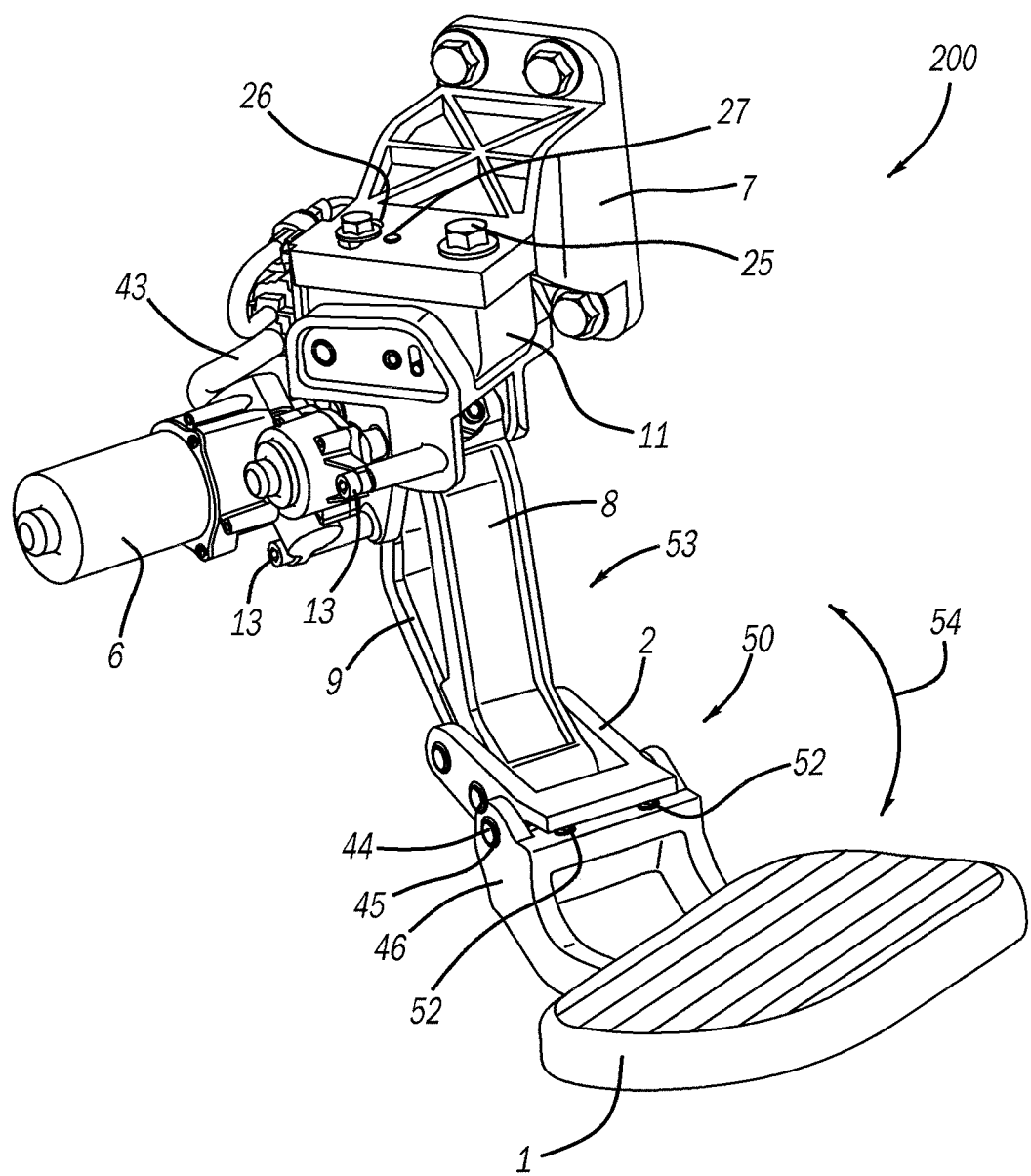
FIG. 12 is an front perspective view of the articulating step of an alternate embodiment of the invention shown in a deployed position.
Figure 13:
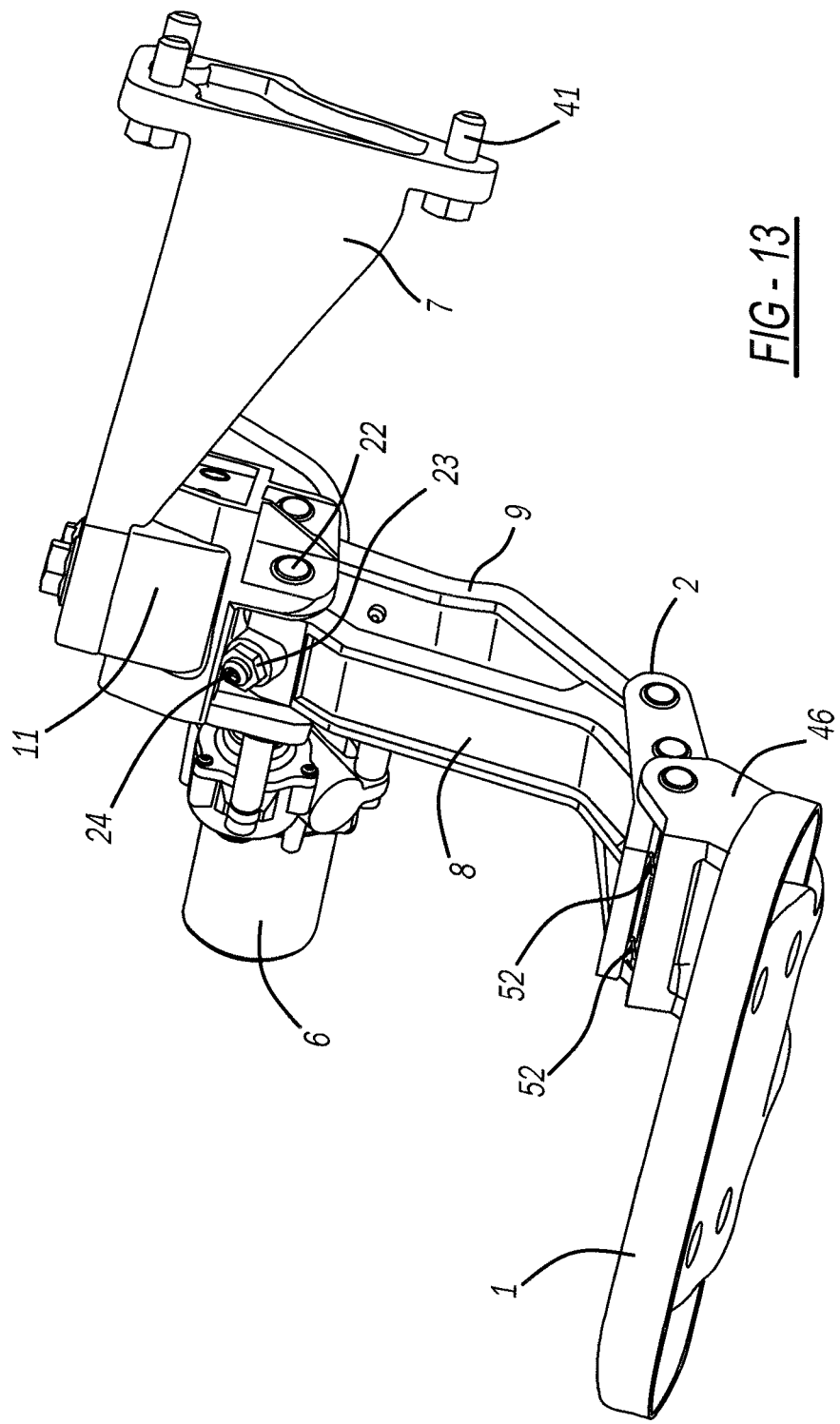
FIG. 13 is another front perspective view of the articulating step of the alternate embodiment of the invention shown in a deployed position.
Figure 14:
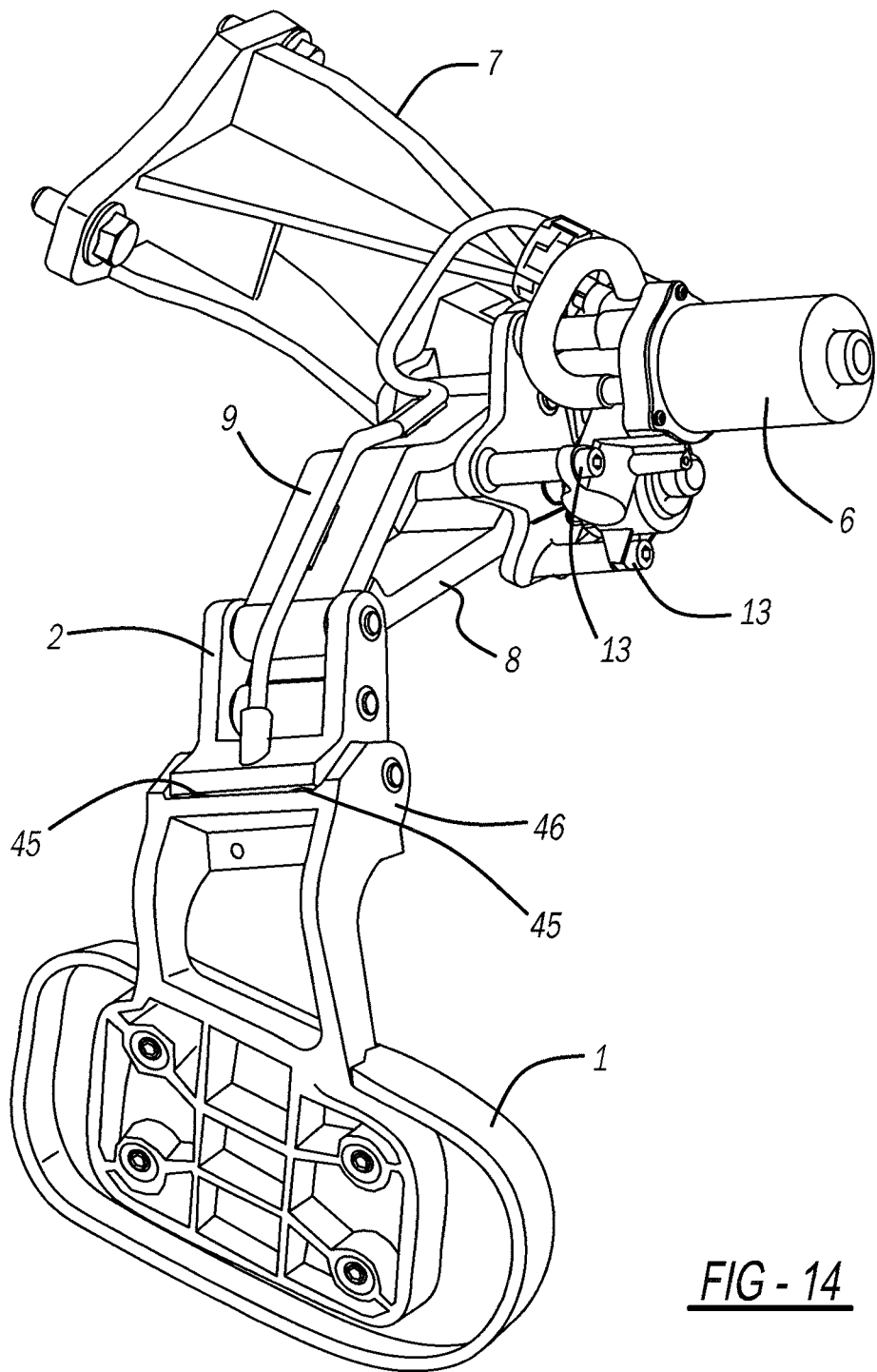
FIG. 14 is a back perspective view of the articulating step of the alternate embodiment of the invention shown in a deployed position.
Figure 15:
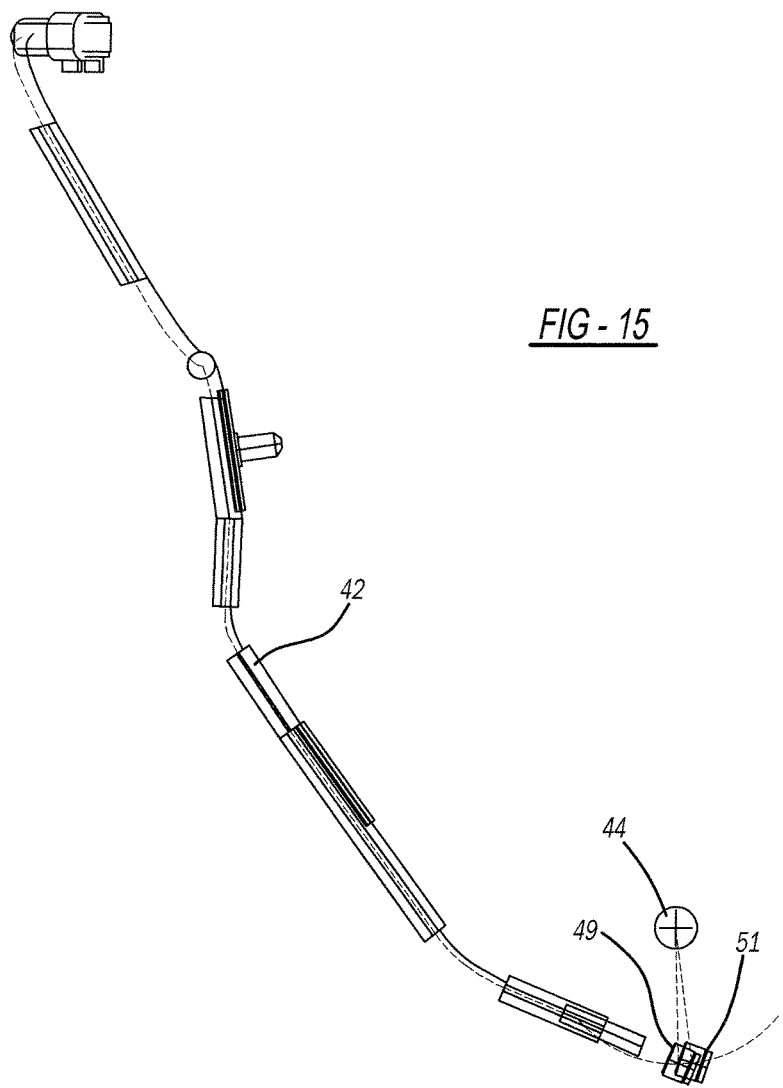
FIG. 15 is a side schematic view of the sensor and electrical connections of the articulating step show in FIGS. 12-14.

Referring back to all the drawings, the lower link 2 forms part of the articulating linkage 53, which is a four bar linkage that includes an outer arm 8 and an inner arm 9, which connect between the lower link 2 and an upper link 12 and the driving motor 6. The outer arm 8 is the driven leg and the inner arm 9 is the following leg. The links 8 and 9 are pivotally attached at pivot axis that are pins 4, 4' disposed through apertures 5, 5' at their respective lower ends. The inner link 9 is pivotally attached to an upper link 12 at a pivot that is a pin 14 positioned through a bearing aperture 21. The outer link 8 is pivotally attached to an output shaft 22 of the motor 6 for driving the step assembly 1 from the deployed position as shown in FIG. 1, to the stowed position as shown in FIGS. 8, 10 and 17 and vice versa. The output shaft 22 is positioned through a bearing aperture 20. As shown in FIGS. 7 and 11, the motor 6 is wired to switch 32 connected an electric control module 31. The switch 32 can be a mechanical or magnetic non-contact type switch actuated when a tail gate 35 is opened, or it can be the non-contact magnetic switch described above or it can be a separate switch actuated by a remote control, such as a key fob 33.

Referring back to FIGS. 12-15 the switch 50 is a reed switch attached in a bore in the lower end of the base member 46. A magnet 51 is secured in a bore formed in a mount 56 of lower link 2 with a plug member 49. The magnet 51 is positioned at the switch 50 so that the switch is actuated when the magnet 51 is moved away from the switch 50. This arrangement provides a switch that is completely sealed from the environment. This protects the switch from road grime mud and the like which will be encountered by such a step attached to a pickup truck on the side or rear of the pickup truck.

Figure 9:
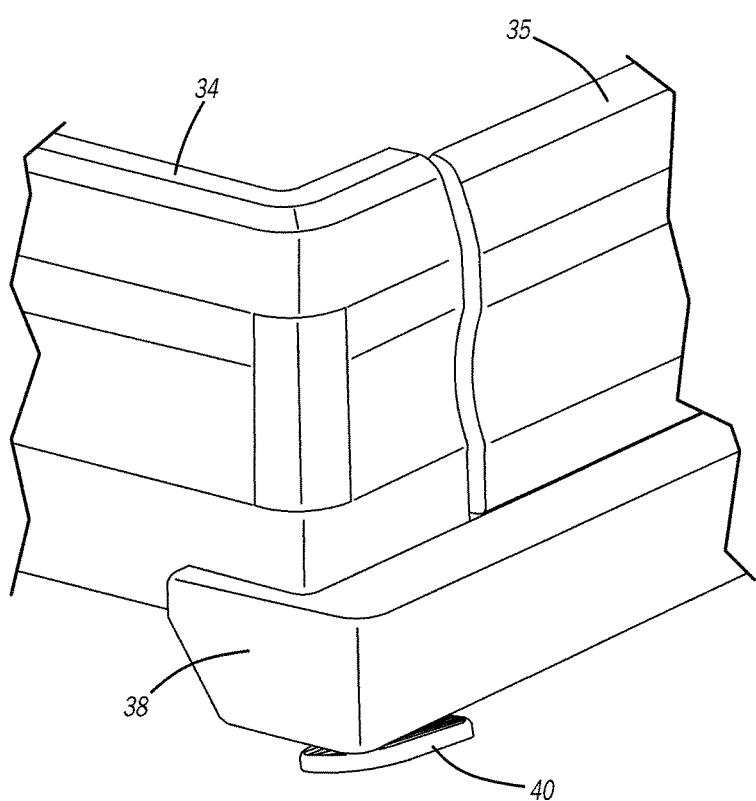
FIG. 9 is an schematic front perspective view of the articulating step in the retracted position, connected to a pickup truck bed.

Referring to FIGS. 9, 10 and 11 when the step is desired to be moved up or down the operator of the step 1 lifts up the outer end of step 1 in the accomplish the predetermined 5 degree rotation along pivot 44. This pivots the magnet 51 in the mount 56 about 3 mm to activate the switch 50. The control unit 31 which senses this and actuates the motor 6 moving the step 1 from deployed to stowed position or stowed to deployed position.

The present invention, as shown in all the figures, further includes a safety arrangement that provides controlled failure of the step assembly 100, 200 in the event of a vertical or horizontal load that is too great for the components of the step assembly 100, 200. In particular the figures show the upper link 12, which is connected to a pivot block 11. The pivot block 11 is connected to the vehicle mount 7. The pivot block 11 is connected to the vehicle mounting bracket 7 by a fixed vertical axis member 25, which allows the pivot block 11 to rotate about the vertical axis member 25.

The pivot block 11 further includes a vertical axis travel limit member 10 which is a bolt connected through a vertical axis travel limit slot 26 formed in the vehicle mount 7. The vertical axis travel limit member 10 defines the minimum horizontal position and maximum horizontal position that the pivot block 11 can rotate. Also provided is a vertical shear pin 27 that prevents the pivot block 11 and the step 1 from moving to the maximum horizontal position unless the vertical shear pin 27 breaks due to a horizontal load being applied to the articulating step assembly 10 in the horizontal direction that is great enough to break the vertical shear pin 27. If the vertical shear pin 27 breaks then the pivot block 11 and the step 1 can rotate to the maximum horizontal position. This causes the step 1 to have a loose feel and rotate to a noticeably different horizontal position, thereby alerting a driver that a controlled failure of the articulating step assembly 100, 200 has occurred.

The upper link 12 and the pivot block 11 are connected to the vehicle mounting bracket 7 through the pivot block 11. The upper link 12 includes a fixed axis member 15 which is a horizontal axis pivot pin that allows the upper link 12 to move vertically up and down about the fixed horizontal axis member 15. The upper link 12 also includes a horizontal axis travel limit member 18 that is a pin slidably disposed in a groove or horizontal travel axis limit slot 19 and defines the minimum vertical position and maximum vertical position that the upper link 12 can rotate about the fixed horizontal axis member 15. There is also a horizontal shear pin 16 that is a pin extending through a sleeve 17 that prevents the upper link 12 and the step 1 from moving to the maximum vertical position, unless the horizontal shear pin 16 breaks. The horizontal shear pin 16 breaks then the upper link 12 can move to the maximum vertical position, which is a downward direction so that the step 1 appears to have a different or noticeable unusable look that notifies the user that a controlled failure of the articulating step assembly 100, 200 has occurred.

Figure 5:
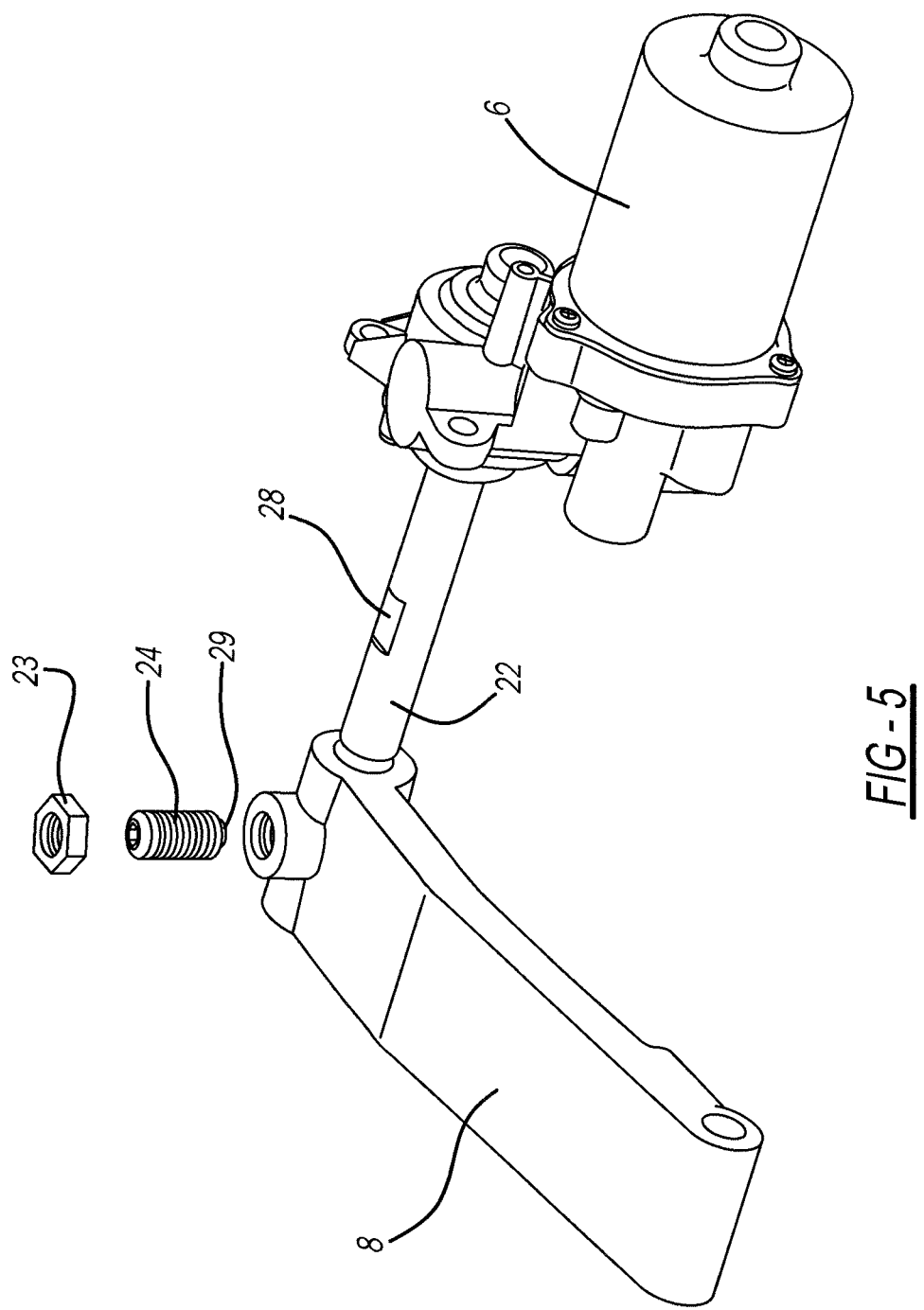
FIG. 5 is an exploded side perspective view of the motor and outer link.
Figure 6:
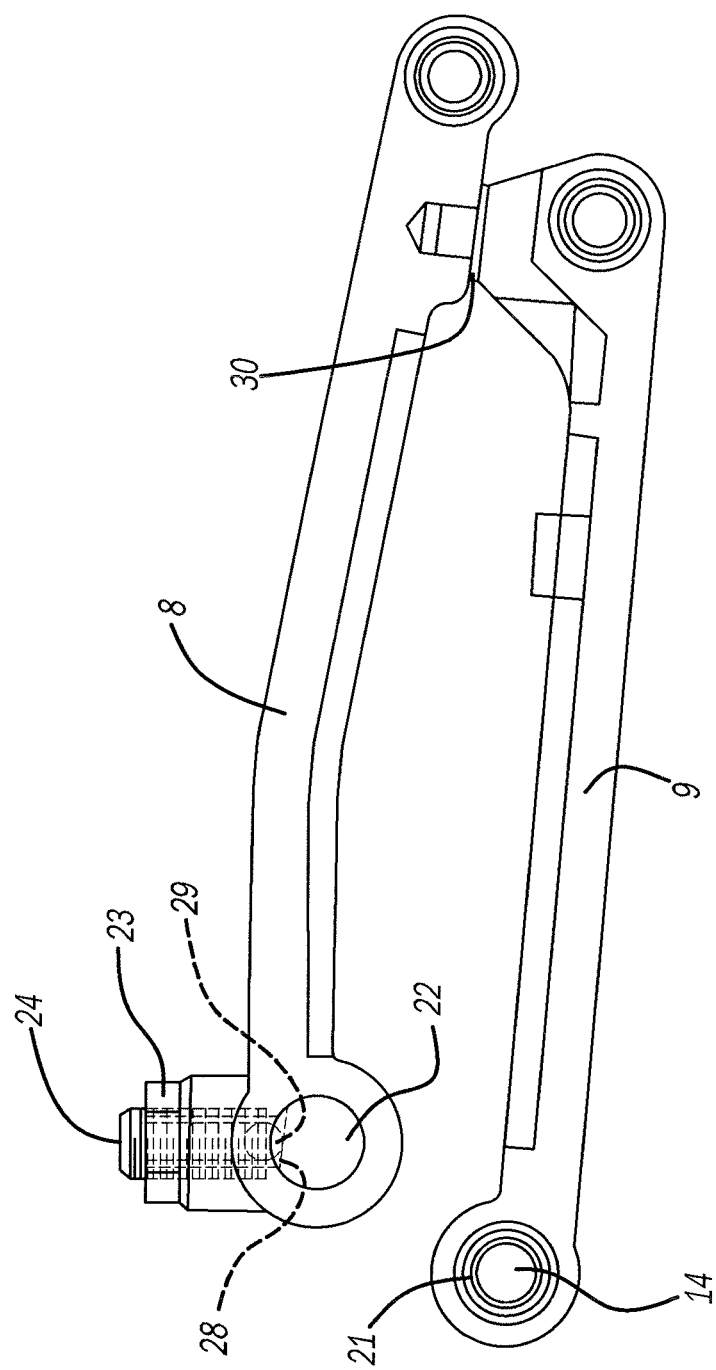
FIG. 6 is a side cross-sectional view of the outer link, inner link and detent.

Referring now to FIG. 5. Another aspect of the invention is shown. FIG. 5 shows the motor which has a motor output shaft 22 that is configured to be rotated by the motor 6. The motor output shaft 22 includes a flat 28 formed on the round shaped motor output shaft 22. The motor output shaft 22 is connected to the articulating linkage 52 by way of the motor output shaft 22 being configured to slide into an aperture in the outer link 8. When positioned in the outer link 8 the flat 28 aligns with an aperture formed on the outer link 8. A spring biased ball detent assembly 24 having a ball member 29 is configured to be placed within the aperture and held in place with a jam nut 23. The ball 29 engages the flat 28 during a deploy operation and the output shaft 22 drives the articulating linkage 53 to move the articulating step assembly 100, 200 from a stowed position to a deployed position. One way of moving the articulating step assembly 100, 200 from the deployed position to the stowed position occurs during a detent unlock event. A detent unlock event occur either intentionally by continuing to rotate the output shaft 22 past the fully deployed position so that the ball 29 moves past the flat 28 or by occurrence of a torque force being applied to the articulating step assembly 100, 200 causing the articulating linkage 53 to rotate so that the ball detent 29 becomes out of contact with the flat 28. When a detent unlock event occurs the articulating step assembly 100, 200 to move upward relative to the ground of the vehicle since the spring force of the ball detent assembly 24 will cause the outer arm 8 to move upward. In order to reset the ball detent assembly 24 the motor is actuated to cause output shaft 22 to rotate 360° until the ball 29 becomes seated against the flat 28 thereby re-connecting the motor output shaft 22 with the outer link arm 8.

Referring now to FIGS. 9-11 the articulating step assembly 100 is shown in the connected to the vehicle 34 in both the stowed (shown in FIGS. 9 and 10) and deployed positions (shown in FIG. 11). The articulating step assembly 100 is connected at the rear of the vehicle 34 beneath and when in the stowed position is slightly forward from a rear bumper 38 that is located in the tailgate 35. When the articulating step assembly 100 is moved to the deployed position, as shown in FIG. 11, the articulating step assembly 100 will move the step 1 downward and back so that the step 1 is extended below the rear bumper 38 and positioned rearward of the rear bumper 38. Also in FIG. 11 the step 1, is also shown in phantom moving downward vertically and sideways horizontally, which occurs when the vertical shear pin 27 and horizontal shear pin 16 break, as described above.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. An articulating step assembly for a vehicle comprising:
a mount for attachment to a vehicle,
a pivot block connected to the mount, wherein the pivot block is capable of moving vertically between a minimum vertical position and a maximum vertical position, and horizontally between a minimum horizontal position and a maximum horizontal position;
a vertical shear pin connected to the pivot block for preventing the pivot block from moving to the maximum horizontal position unless the vertical shear pin breaks;
a step member;
an articulating linkage connecting the pivot block and the step for moving the step between the stowed position and the deployed position; and
a motor attached to the articulating linkage to drive the articulating linkage.

2. The articulating step assembly of claim 1 further comprising;
a motor output shaft having a round outer surface, the motor output shaft is connected to both the motor and the articulating linkage such that the motor rotates the motor output shaft and drives movement of the articulating linkage;
a flat formed on the motor output shaft;
a spring biased detent assembly connected to the articulating linkage and positioned to engage the flat on the motor output shaft during a deployment operation and during a detent unlock operation the spring biased detent engages the round outer surface of the motor shaft and causes the articulating linkage to move in an upward direction toward the vehicle.

3. The articulating step assembly of claim 1 further comprising a horizontal shear pin connected to the pivot block for preventing the pivot block from moving to the maximum vertical position unless the horizontal shear pin breaks.

4. The articulating step assembly of claim 1 further comprising a non-contact switch located on the articulating step assembly for actuating the motor and linkage in response to movement of the step, wherein the non-contact switch is a magnetic reed switch.

5. The articulating step assembly of claim 4 wherein the step member includes a magnet and is operably associated with a non-contact switch on the linkage, the step includes an assembly which allows rotation for separating the magnet from the reed switch for actuation and deployment of the step into one of the deployed or stowed positions.

6. The articulating step assembly of claim 5 wherein the step member includes a base pivotally attached to the bottom link and the base is biased for holding the step in a downward position wherein the step can be moved upward for tripping the switch and actuating the assembly.

7. The articulating step of claim 6 further comprising a motor control unit;
said motor control unit having over current sensing capabilities for sensing the limits of travel of the four bar linkage and shutting off the motor when the assembly is in the stowed position and the deployed position.

8. The articulating step assembly of claim 1, wherein the articulating linkage comprises a four bar link assembly for raising and lowering the step, the four bar link assembly includes a bottom link connected between the step and the pivot block and an upper link connected between the step, the pivot block and an output shaft of the motor.

9. The articulating step assembly of claim 1 wherein the mount further comprises:
wherein the pivot block includes a fixed vertical axis member about which the pivot block and the step member rotate, a vertical axis travel limit member that defines the minimum horizontal position and the maximum horizontal position of the pivot block and the step; and
an upper link connected to the pivot block and having a fixed horizontal axis member connecting the upper link to the pivot block, the upper link and the step pivot vertically about the fixed horizontal axis member, a horizontal axis travel limit member of the upper link that defines the minimum vertical position and maximum vertical position of the upper link and the step.

10. An articulating step assembly for a vehicle comprising:
a mount for attachment to a vehicle,
a pivot block connected to the mount, wherein the pivot block is capable of moving vertically between a minimum vertical position and a maximum vertical position, and horizontally between a minimum horizontal position and a maximum horizontal position;
a vertical shear pin connected to the pivot block for preventing the pivot block from moving to the maximum horizontal position unless the vertical shear pin breaks;
a horizontal shear pin connected to the pivot block for preventing the pivot block from moving to the maximum vertical position unless the horizontal shear pin breaks;
a step member;
an articulating linkage connecting the pivot block and the step for moving the step between a stowed position and a deployed position stowing and deploying the step;

a motor for attached to the articulating linkage to drive the articulating linkage;

a fixed vertical axis member of the pivot block about which the pivot block and the step member rotate;

a vertical axis travel limit member of the pivot block that defines the minimum horizontal position and the maximum horizontal position of the pivot block and the step; and an upper link connected to the pivot block and having a fixed horizontal axis member connecting the upper link to the pivot block, the upper link and the step pivot vertically about the fixed horizontal axis member, a horizontal axis travel limit member of the upper link that defines the minimum vertical position and maximum vertical position of the upper link and the step.

11. The articulating step assembly of claim 10 further comprising;

a motor output shaft having a round outer surface, the motor output shaft is connected to both the motor and the articulating linkage such that the motor rotates the motor output shaft and drives movement of the articulating linkage;

a flat formed on the motor output shaft;

a spring biased detent assembly connected to the articulating linkage and positioned to engage the flat on the motor output shaft during a deployment operation and during a detent unlock operation the spring biased detent engages the round outer surface of the motor shaft and causes the articulating linkage to move in an upward direction toward the vehicle.

12. The articulating step assembly of claim 10 further comprising a non-contact switch located on the articulating step assembly for actuating the motor and linkage in response to movement of the step, wherein the non-contact switch is a magnetic reed switch.

13. The articulating step assembly of claim 12 wherein the step member includes a magnet and is operably associated with a non-contact switch on the linkage, the step includes an assembly which allows rotation for separating the magnet from the reed switch for actuation and deployment of the step into one of the deployed or stowed positions.

14. The articulating step assembly of claim 13 wherein the step member includes a base pivotally attached to the bottom link and the base is biased for holding the step in a downward position wherein the step can be moved upward for tripping the switch and actuating the assembly.

15. The articulating step of claim 14 further comprising:
a motor control unit;
said motor control unit having over current sensing capabilities for sensing the limits of travel of the four bar linkage and shutting off the motor when the assembly is in the stowed position and the deployed position.

16. The articulating step assembly of claim 10 wherein the articulating linkage comprises a four bar link assembly for raising and lowering the step, the four bar link assembly includes a bottom link connected between the step and the pivot block and an upper link connected between the step, the pivot block and an output shaft of the motor.

17. The articulating step assembly of claim 16 wherein the four bar link assembly has a bottom link and the step is pivotally connected to the bottom link for pivoting upward for a predetermined range of motion.

18. An articulating step assembly for a vehicle comprising:
a mount for attachment to a vehicle,
a pivot block connected to the mount, wherein the pivot block is capable of moving vertically between a minimum vertical position and a maximum vertical position, and horizontally between a minimum horizontal position and a maximum horizontal position;

a vertical shear pin connected to the pivot block for preventing the pivot block from moving to the maximum horizontal position unless the vertical shear pin breaks;

a horizontal shear pin connected to the pivot block for preventing the pivot block from moving to the maximum vertical position unless the horizontal shear pin breaks;

a step member;

an articulating linkage connecting the pivot block and the step for moving the step between a stowed position and a deployed position stowing and deploying the step, wherein the articulating linkage comprises a four bar link assembly for raising and lowering the step, the four bar link assembly includes a bottom link connected between the step and the pivot block and an upper link connected between the step, the pivot block and an output shaft of the motor;

a motor for attached to the articulating linkage to drive the articulating linkage;

a fixed vertical axis member of the pivot block about which the pivot block and the step member rotate;

a vertical axis travel limit member of the pivot block that defines the minimum horizontal position and the maximum horizontal position of the pivot block and the step;

an upper link connected to the pivot block and having a fixed horizontal axis member connecting the upper link to the pivot block, the upper link and the step pivot vertically about the fixed horizontal axis member, a horizontal axis travel limit member of the upper link that defines the minimum vertical position and maximum vertical position of the upper link and the step;

a motor output shaft having a round outer surface, the motor output shaft is connected to both the motor and the articulating linkage such that the motor rotates the motor output shaft and drives movement of the articulating linkage;

a flat formed on the motor output shaft; and a spring biased detent assembly connected to the articulating linkage and positioned to engage the flat on the motor output shaft during a deployment operation and during a detent unlock operation the spring biased detent engages the round outer surface of the motor shaft and causes the articulating linkage to move in an upward direction toward the vehicle.

19. The articulating step assembly of claim 18 wherein the four bar link assembly has a bottom link and the step is pivotally connected to the bottom link for pivoting upward for a predetermined range of motion.

20. The articulating step assembly of claim 18 further comprising a non-contact switch located on the articulating step assembly for actuating the motor and linkage in response to movement of the step, wherein the non-contact switch is a magnetic reed switch.

21. The articulating step assembly of claim 20 wherein the step member includes a magnet and is operably associated with a non-contact switch on the linkage, the step includes an assembly which allows rotation for separating the magnet from the reed switch for actuation and deployment of the step into one of the deployed or stowed positions.

22. The articulating step assembly of claim 21 wherein the step member includes a base pivotally attached to the bottom link and the base is biased for holding the step in a downward position wherein the step can be moved upward for tripping the switch and actuating the assembly.

23. The articulating step of claim 22 further comprising:
a motor control unit;
said motor control unit having over current sensing capabilities for sensing the limits of travel of the four bar linkage and shutting off the motor when the assembly is in the stowed position and the deployed position.

* * * * *